US011969698B2

(12) United States Patent
Hildreth et al.

(10) Patent No.: US 11,969,698 B2
(45) Date of Patent: Apr. 30, 2024

(54) HIGH CAPACITY SELF-CLEANING BRINE MAKER

(71) Applicant: Brine Masters, LLC, Carmel, IN (US)

(72) Inventors: Clay Hildreth, Carmel, IN (US); Christopher Robert Thomas, Raleigh, NC (US); Andrew John Humke, Dubuque, IA (US)

(73) Assignee: BRINE MASTERS, LLC, Carmel, IN (US)

(*) Notice: Subject to any disclaimer, the term of this patent is extended or adjusted under 35 U.S.C. 154(b) by 494 days.

(21) Appl. No.: 17/226,715

(22) Filed: Apr. 9, 2021

(65) Prior Publication Data

US 2021/0316256 A1 Oct. 14, 2021

Related U.S. Application Data

(60) Provisional application No. 63/008,371, filed on Apr. 10, 2020.

(51) Int. Cl.
*B01F 21/00* (2022.01)
*B01F 21/20* (2022.01)
(Continued)

(52) U.S. Cl.
CPC .............. *B01F 21/15* (2022.01); *B01F 21/20* (2022.01); *B01F 23/405* (2022.01); *B01F 35/13* (2022.01);
(Continued)

(58) Field of Classification Search
CPC .......... B01F 21/00; B01F 21/15; B01F 21/20; B01F 21/50; B01F 21/503; B01F 23/00;
(Continued)

(56) References Cited

U.S. PATENT DOCUMENTS 4,990,317 A * 2/1991 Mak ........................ B01D 53/68 423/240 R
7,366,621 B2 4/2008 Sprague
(Continued)

FOREIGN PATENT DOCUMENTS

KR 10-0851776 8/2008
WO WO 2009/123456 A2 10/2009

OTHER PUBLICATIONS

Henderson Products, Inc., "Henderson BrineXtreme Infinity Demonstration", uploaded to YouTube on July 18, 2018, pp. 1-21, Uploaded by "Henderson Products" YouTube account, Available at https://www.youtube.com/watch?v=j1RX2x-9Fn4.

*Primary Examiner* — Natasha E Young
(74) *Attorney, Agent, or Firm* — HUSSEY IP, LLC

(57) ABSTRACT

A system for making a brine solution is provided comprising: a single conveyor; and a hopper assembly configured to receive a salt and a solvent, the hopper assembly comprising a lower hopper having a shape in which sides of the lower hopper direct any solid contents of the lower hopper, under a force of gravity, towards an entry point of the single conveyor, the hopper assembly further comprising a solvent inlet arranged to spray the salt, wherein the solvent inlet is configured to create a brine solution from a spray of the solvent combined with the salt in the hopper assembly, and wherein the single conveyor is configured to remove debris from the hopper assembly at the entry point of the single conveyor. A novel sediment tank is also provided.

17 Claims, 12 Drawing Sheets

(51) Int. Cl.

| | |
|---|---|
| ***B01F 23/40*** | (2022.01) |
| ***B01F 35/13*** | (2022.01) |
| ***B01F 35/21*** | (2022.01) |
| ***B01F 35/212*** | (2022.01) |
| ***B01F 35/221*** | (2022.01) |
| ***B01F 35/71*** | (2022.01) |
| ***B01F 35/75*** | (2022.01) |
| ***B01F 35/83*** | (2022.01) |
| ***F04D 27/00*** | (2006.01) |
| ***F04D 29/66*** | (2006.01) |

(52) U.S. Cl.
CPC ..... *B01F 35/21112* (2022.01); *B01F 35/2113* (2022.01); *B01F 35/212* (2022.01); *B01F 35/2214* (2022.01); *B01F 35/2217* (2022.01); *B01F 35/718051* (2022.01); *B01F 35/7544* (2022.01); *B01F 35/833* (2022.01); *F04D 27/004* (2013.01); *F04D 29/66* (2013.01); *B01F 21/503* (2022.01)

(58) Field of Classification Search
CPC ........ B01F 23/40; B01F 23/405; B01F 35/00; B01F 35/10; B01F 35/13; B01F 35/20; B01F 35/21; B01F 35/211; B01F 35/2111; B01F 35/21112; B01F 35/2112; B01F 35/2113; B01F 35/212; B01F 35/22; B01F 35/221; B01F 35/2214; B01F 35/2217; B01F 35/71; B01F 35/717; B01F 35/71805; B01F 35/718051; B01F 35/75; B01F 35/754; B01F 35/7544; B01F 35/80; B01F 35/83; B01F 35/833; F04D 7/00; F04D 7/02; F04D 7/04; F04D 13/00; F04D 13/16; F04D 15/00; F04D 15/02; F04D 15/0209; F04D 15/0218; F04D 27/00; F04D 27/004; F04D 29/00; F04D 29/66
See application file for complete search history.

(56) References Cited

U.S. PATENT DOCUMENTS

| | | | | |
|---|---|---|---|---|
| 7,810,987 | B2 | 10/2010 | Hildreth | |
| 8,251,569 | B2 | 8/2012 | Hildreth | |
| 8,382,364 | B2 | 2/2013 | Hildreth | |
| 8,870,444 | B2 * | 10/2014 | Hildreth | B01F 35/1453 366/136 |
| 9,156,013 | B2 | 10/2015 | Hildreth et al. | |
| 10,376,854 | B2 | 8/2019 | Hildreth et al. | |
| 10,544,340 | B2 | 1/2020 | Nesheim et al. | |
| 10,766,010 | B2 | 9/2020 | Nesheim et al. | |
| 10,960,363 | B2 | 3/2021 | Hildreth et al. | |
| 2009/0092001 | A1 | 4/2009 | Hildreth et al. | |
| 2017/0097295 | A1 | 4/2017 | Verkanck et al. | |
| 2020/0041481 | A1 | 2/2020 | Burgess | |
| 2021/0178343 | A1 | 6/2021 | Hildreth et al. | |

* cited by examiner

SECTION D-D

SECTION B-B

HIGH CAPACITY SELF-CLEANING BRINE MAKER

CROSS-REFERENCE TO RELATED APPLICATIONS

This application is a non-provisional application of U.S. provisional patent application 63/008,371 filed Apr. 10, 2020, the entire contents of which is hereby incorporated by reference.

TECHNICAL FIELD

This application relates to industrial equipment and, in particular, to brine making machines.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 5:
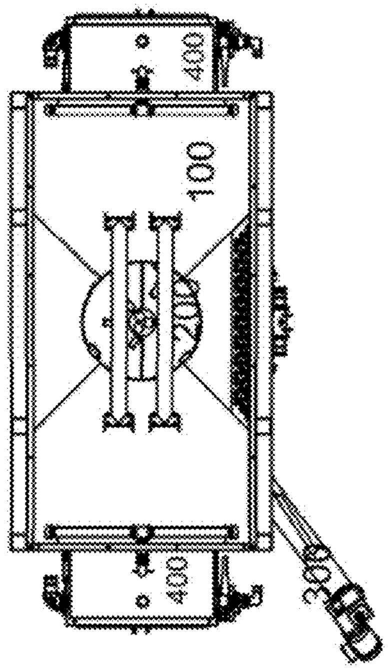
FIG. 5 is a top view of the brine maker shown in FIG. 1.
Figure 4:
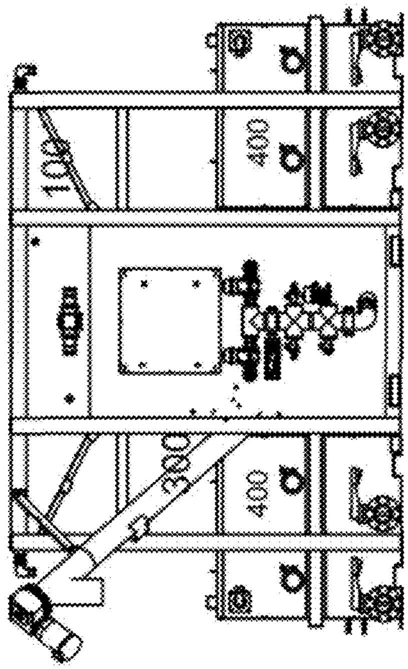
FIG. 4 is a front view of the brine maker shown in FIG. 1.
Figure 3:
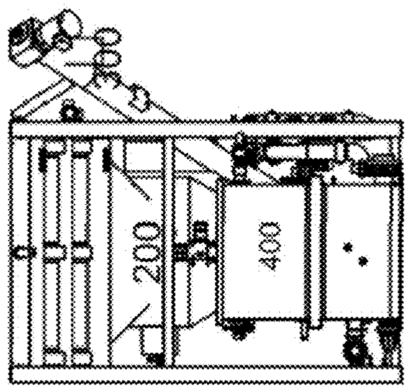
FIG. 3 is a side view of the right side the brine maker shown in FIG. 1.
Figure 1:
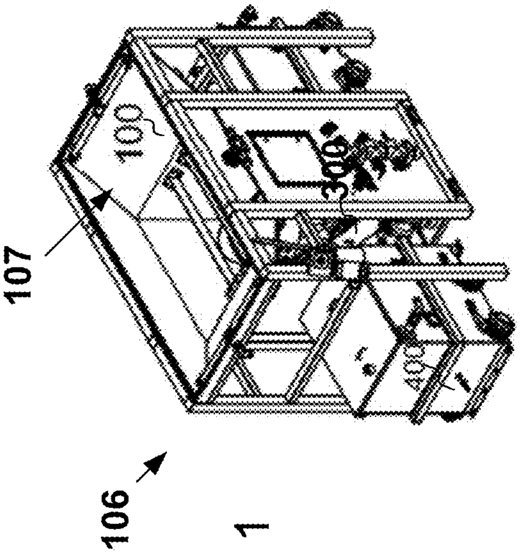
FIG. 1 is a perspective view of the front right side of an example of a brine maker.
Figure 2:
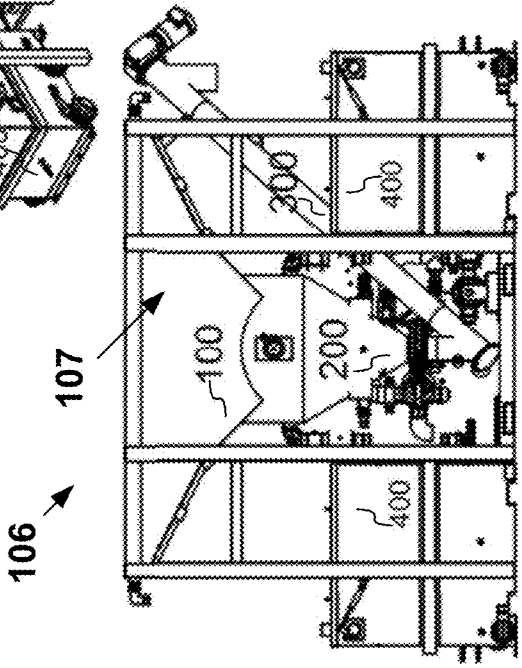
FIG. 2 is a rear view of the brine maker shown in FIG. 1.
Figure 6:
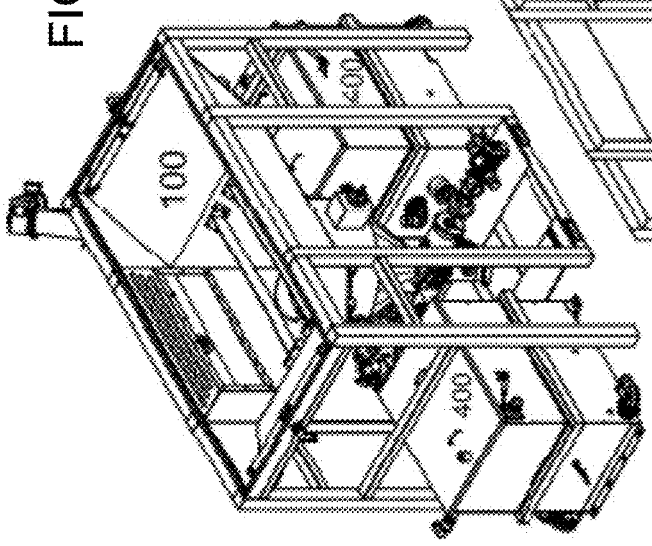
FIG. 6 is a perspective view of the rear left side the brine maker shown in FIG. 1.
Figure 7:
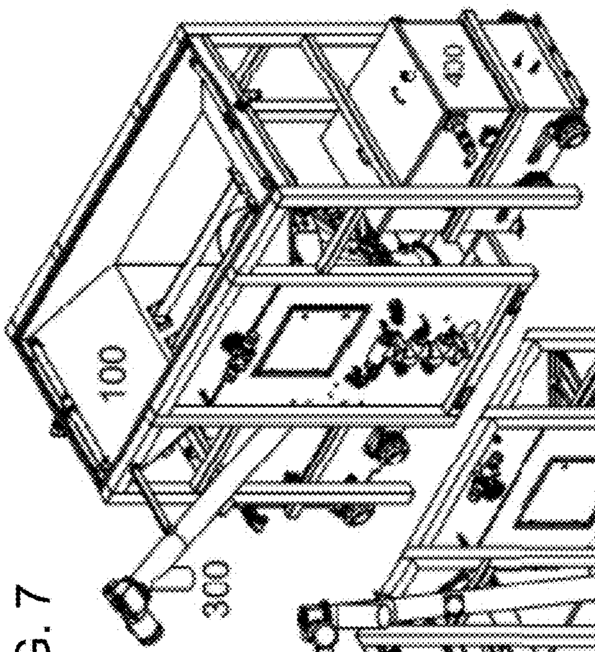
FIG. 7 is a perspective view of the front left side the brine maker shown in FIG. 1.
Figure 8:
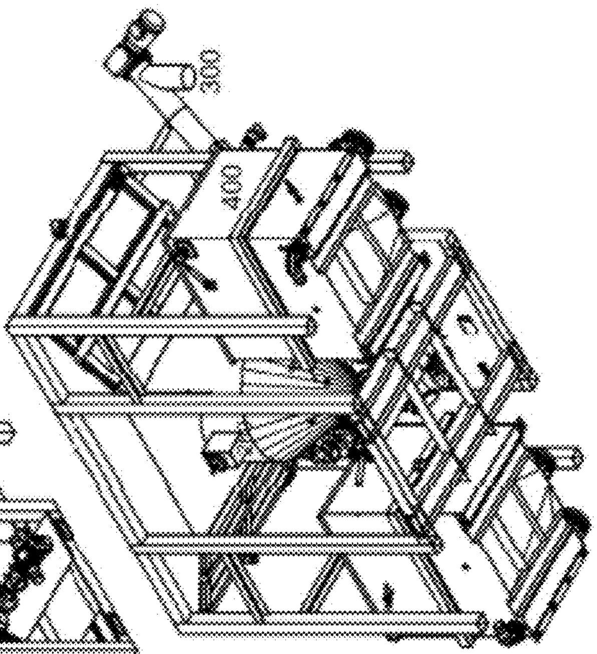
FIG. 8 is a cutaway perspective view of the rear left side the brine maker shown in FIG. 1.
Figure 9:
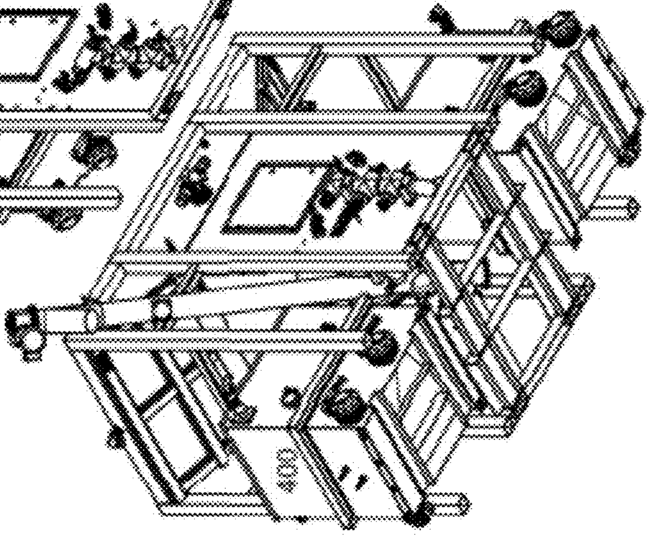
FIG. 9 is a cutaway perspective view of the rear right side the brine maker shown in FIG. 1.
Figure 12:
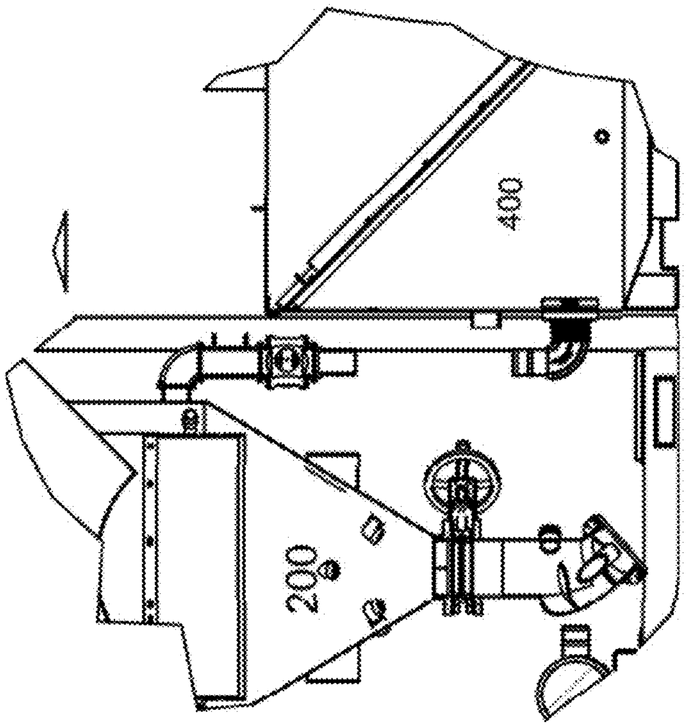
FIG. 12 is a cross-section of the brine maker at an area marked H in FIG. 11.
Figure 10:
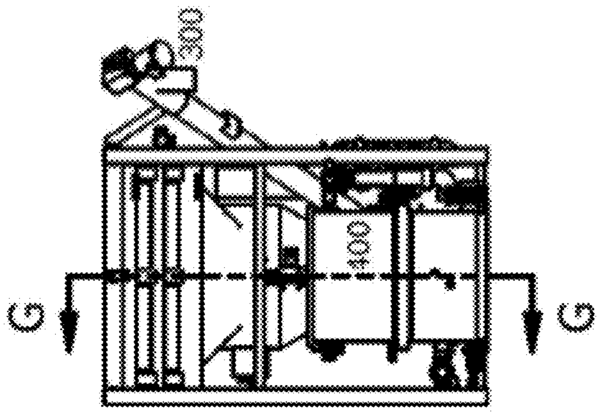
FIG. 10 is side view of the right side the brine maker showing a section line G-G extending vertically through the middle of the brine maker.
Figure 11:
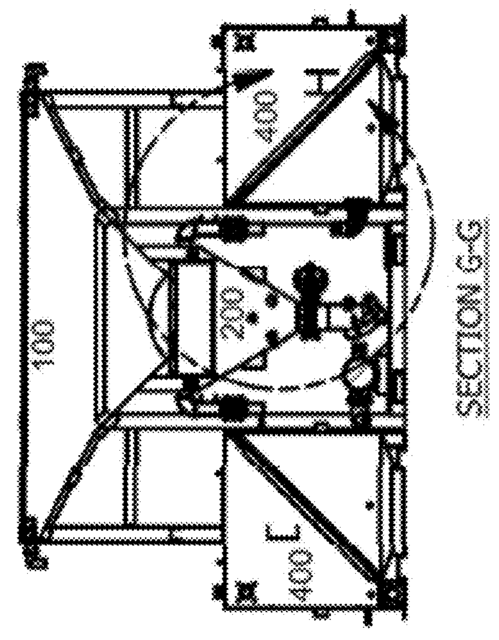
FIG. 11 is a cross-section of the brine maker cut along the section line G-G.

Salt Brine is a common solution used in industrial and food applications; Brine is also used as a melting agent in managing snow and ice on surfaces such as roadways, parking lots and sidewalks. Salt brine is made into a solution by combining NaCl and water ($H_2O$) into a solution, typically a 23.3% solution Wt./Wt. when used as a melting agent for snow and ice control. Solutions having NaCl concentrations other than 23.3% are also used as a melting agent for snow and ice.

When used on roadways, the volume of product (salt brine) required can exceed over 1,000,000 gallons per season for a single user. A volume of 1,000,000 gallons of solution at 23.3% saturation contains 2.288 lbs. of salt. In many areas of the world, the most cost effective salt (NaCl) available is mined rock salt that may have typically 3-5% foreign material, which is also called material other than salt (referred to as "MOS"). Examples of MOS include sand, calcium sulfate, shale, in addition to other debris from transportation in trucks such as corn, wheat, and any other material other than salt. With a typical production rate being 50 to 100+ gallons per minute (GPM), these materials build up at high rate, such as a rate in a range 5 to 12 lbs. of MOS per minute. Having to clean out such a large amount of MOS from brine makers can be labor intensive and difficult. In addition, this clean out is a non-productive use of time of the operators for stopping the process to clean out the brine maker.

The process of making a salt brine solution involves suspending salt in water. This is typically done by two primary methods: soaking the salt in $H_2O$ or by eroding the salt away with $H_2O$. Typically, the erosion method produces brine faster at high concentrations of NaCl.

As the NaCl goes into suspension, the non-dissolvable materials remain behind inside of the brine maker, or become suspended in the brine solution. This non-dissolvable matter may also bind up the salt so it does not go into solution, thereby plugging up flow paths, or otherwise causing issues. As foreign material accumulates, typically the brine production process slows until a point where the machine must be shut down and have this MOS removed in order for brine production to resume again.

The methods and devices described herein may produce clean brine, without salt having excessive non-dissolvable material taken into suspension during the brine production process, which would otherwise cause maintenance issues. Storage tanks may have sediment build up on the bottom of the tanks. In addition, application equipment uses flow meters, pumps, and spray nozzles that get damaged or experience premature wear due to abrasives in the solution. Therefore, filtration of the brine solution to reduce the contamination may be desirable. Removing the MOS as wetted material instead of being included in a slurry may also be desirable because special handling of waste may be minimized.

The methods and devices described herein may make relatively clean brine rapidly at a target concentration without necessarily having to periodically shut the system down. In addition, the methods and devices described herein may be able to have the system performing continuously at or near peak performance while producing large volumes of solution at the target concentration. Alternatively or in addition, the methods and devices described herein may include or involve a continuous self-cleaning brine production system with mechanical self-cleaning filtration. Alternatively or in addition, the methods and devices described herein may include areas of relatively high and low velocities in order to allow suspended insoluble material to fall out of suspension due to gravity without having to mechanically separate the insoluble material from the brine solution.

An example of a brine maker 106, which is a system 106 for producing a brine solution, is shown in the figures. Various aspects are described below, examples of which may be shown in the figures. The system 106 operates in part using gravity. Therefore, the system 106 has a first end designed to face in the direction of the force of gravity, and a second end that is designed to face in the opposite direction of the force of gravity. Accordingly, in describing components of the system 106 using terms such top and bottom or upper and lower, the terms top and upper refer to an end of the component facing in the opposite direction of the force of gravity, and the terms bottom and lower refer to an end of the component facing in the direction of the force of gravity. Similarly, the phrase "A is higher than B" means that A is closer to the top than B, and the phrase "A is lower than B" means that A is closer to the bottom than B. Similarly, the phrase "A is above B" means that A is closer to the top than B, and the phrase "A is below B" means that A is closer to the bottom than B.

The system 106 shown in FIGS. 1 through 31 comprises: a hopper assembly 107 configured to receive salt (NaCl) and a solvent ($H_2O$) to make a brine solution; and a single conveyor 300 located at the bottom of the hopper assembly 107. The conveyor 300 is configured to remove debris out as a wetted material. As described further below, a process of the single conveyor 300 removing the debris may be performed while the brine maker 106 is making a brine solution for efficiency reasons.

Figure 14:
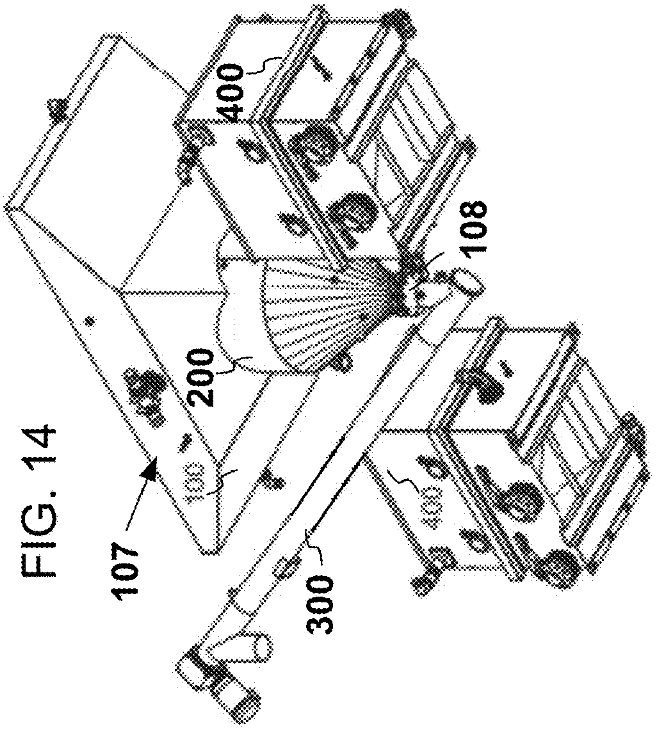
FIG. 14 is a perspective view of the lower front left side of the brine maker without a support frame.

The hopper assembly 107 includes an upper hopper 100 and a lower hopper 200. The lower hopper 200 is fed by the upper hopper 100. The upper hopper 100 is configured to receive salt from an opening at the top of the upper hopper 100, and direct the received salt to the lower hopper 200. Referring to FIG. 14, the lower hopper 200 has a cylindrical top and a cone-shaped bottom in the illustrated example. However, the lower hopper 200 may have any other shape in which the contents of the lower hopper 200 are directed toward an entry point 108 of the single conveyor 300 by the sides of the lower hopper 200. For example, the lower hopper 200 may have a pyramid shape where the tip of the pyramid points downward toward the entry point 108. The contents of the illustrated lower hopper 200 (for example, water, NaCl, and debris) are directed by the sides of the cone to the entry point 108 of the single conveyor 300.

Figure 19:
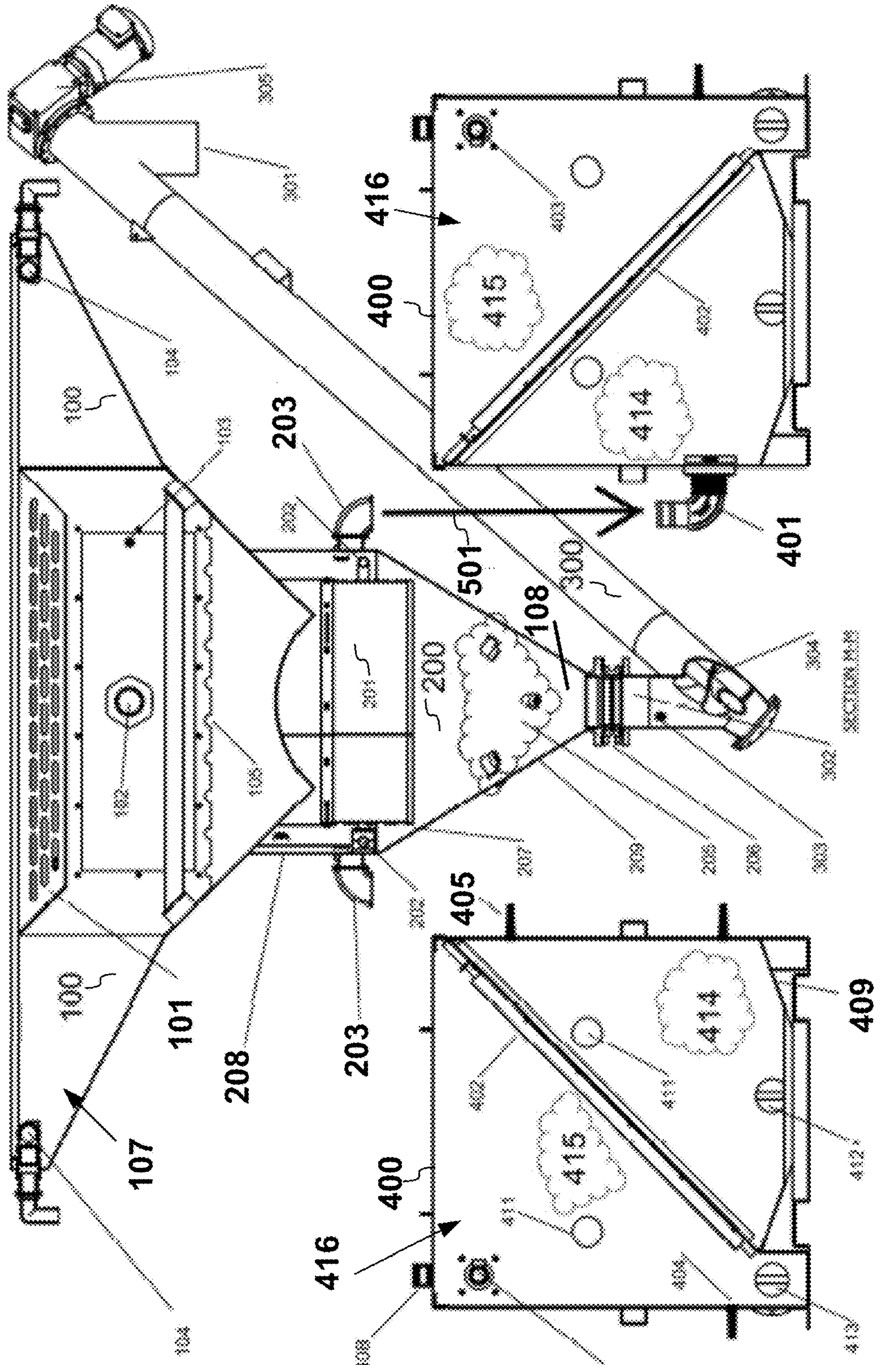
FIG. 19 is a cross-section of the brine maker without a support frame cut along the section line M-M.
Figure 18:
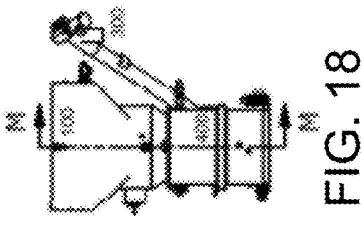
FIG. 18 is a side view of right side of the brine maker without a support frame showing a section line M-M extending vertically through the middle of the brine maker.
Figure 21:
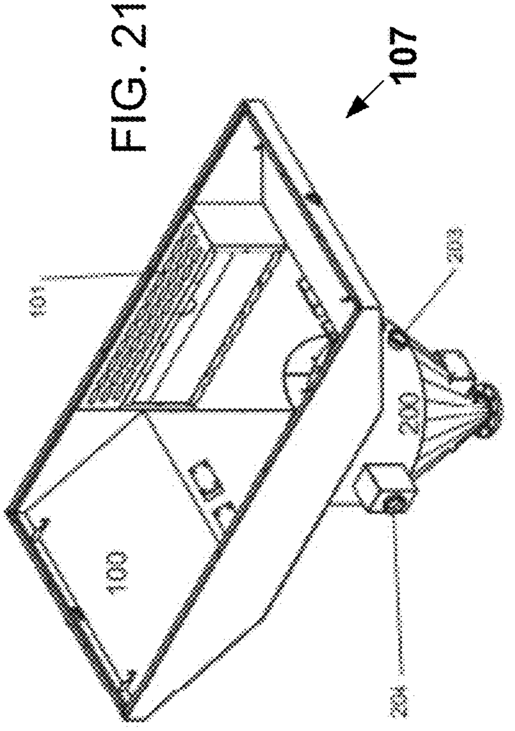
FIG. 21 is a perspective view of upper rear right side of the hopper assembly.
Figure 24:
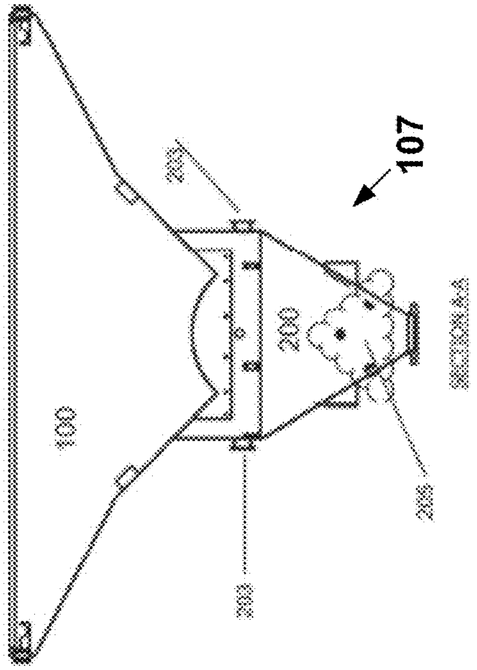
FIG. 24 is a cross-section of the hopper assembly cut along the section line A-A.
Figure 23:
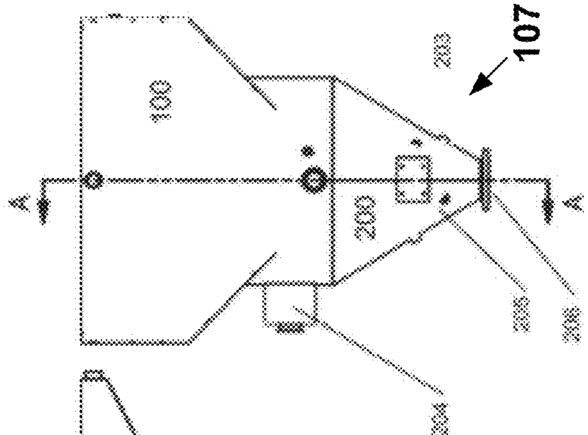
FIG. 23 is a side view of the right side of the hopper assembly showing a section line A-A extending vertically through the middle of the brine maker.
Figure 20:
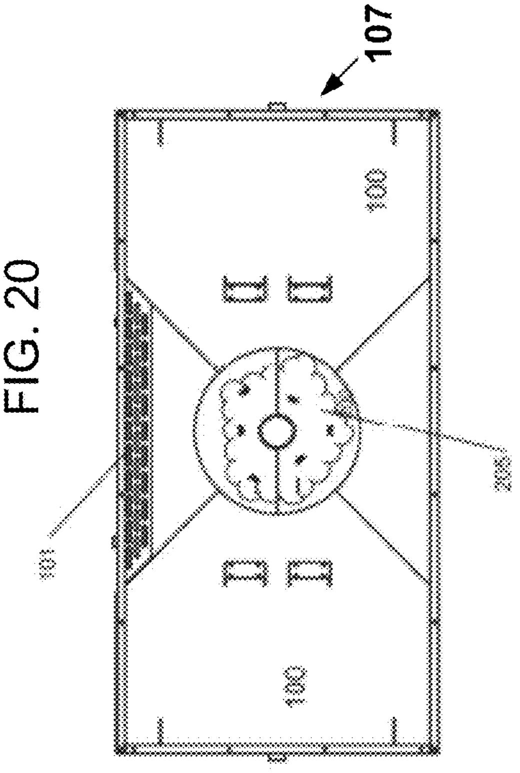
FIG. 20 is a top view of a hopper assembly of the brine maker.

Referring to FIG. 19, the lower hopper 200 may include, in some examples, a solvent inlet array 205. The solvent inlets array 205 includes one or more spray nozzles or more generally, solvent inlets. The solvent inlets array 205 may be located above or immediately above the entry point 108 of the conveyor 300. With such an arrangement, the solvent inlets array 205 are configured to spray liquid solvent, such as $H_2O$, onto the NaCl located in the lower hopper 200. The sprayed liquid dissolves NaCl located in the lower hopper 200, thereby forming a brine solution. As a result, the lower hopper 200 may be considered to define a dissolving chamber. One or more outlets 203 located above the solvent inlets array 205 allow the brine solution to flow from the hopper assembly 107. As a result of the location of the outlets 203, solids may fall out of suspension in the hopper assembly 107 prior to brine solution exiting through the outlets 203. In the process of dissolving the NaCl, waste solids, which may have initially been intermixed with the salt, fall to the bottom of the lower hopper 200 and into the entry point 108 of the conveyor 300. The conveyor 300 is configured to discharge the waste solids located at the entry point 108 of the conveyor 300.

In some examples, such as in the illustrated example, one or more stage filters 201 are arranged within the hopper assembly 107 to filter the brine solution. As the brine solution exits the dissolving chamber defined by the lower hopper 200, the brine solution passes through the filter(s) 201 before exiting through the outlet(s) 203. The filter(s) 201 may be mounted so that debris that gathers onto the surface of the filter(s) 201 may fall off toward the bottom of the hopper assembly 107. For example, the filter 201 may include a cylindrical screen arranged so its axis extends vertically as shown in FIG. 19. In other words, the bases of a cylinder defined by the cylindrical screen are parallel to a horizontal plane. Both ends of the cylindrical screen are open in the illustrated example to allow salt and/or debris to pass through vertically, but other shapes and configurations are possible.

The hopper assembly 107 may include a mechanism for automatically cleaning the filter(s) 201 in some examples. In the illustrated example, the hopper assembly 107 includes a back wash 202 to back flush the filter(s) 201. Periodically, the back wash 202, which includes one or more spray nozzles, may spray water against an outer surface of the filter(s) 201 (for example, an output side of the filter(s)). This may cause debris that is stuck to an inner surface of the filter(s) to be dislodged and fall toward the bottom of the hopper assembly 107.

The single conveyor 300 in the illustrated example has a discharge height above the highest level of the brine containment area of the hopper assembly 107. Alternatively, the single conveyor 300 may have a different discharge height in other examples. The system 106 includes the single conveyor 300 in the sense that an additional conveyor is not needed within the hopper assembly 107 to move debris from one point within the hopper assembly 107 to the entry point 108 of the single conveyor 300. This is due to the shape of the lower hopper 200 directing the contents of the lower hopper 200, which are pulled by gravity, toward the entry point 108 of the single conveyor 300. Nevertheless, the single conveyor 300 itself may comprise multiple stages or multiple conveyors arranged to transport the debris from the single entry point 108 of the single conveyor 300 to a discharge point or points of the single conveyor 300. The single conveyor 300 may include a blade 304, such as a screw blade as shown in FIG. 19. Examples of the conveyor 300 include a screw conveyor, an auger, a waste discharge auger, a lift conveyor, or any other conveyor suitable for transporting debris. The conveyor 300 may be powered by an electric motor 305 or any other type of motor.

Figure 13:
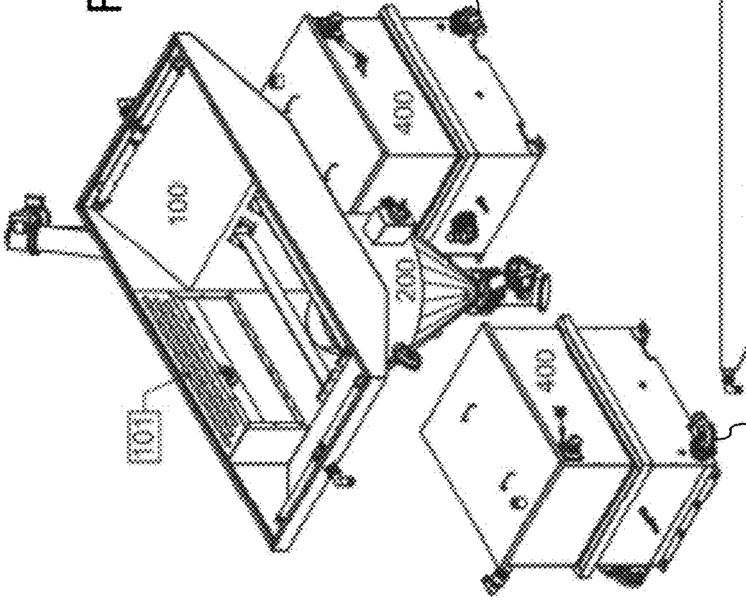
FIG. 13 is a perspective view of the upper front right side of the brine maker without a support frame.
Figure 15:
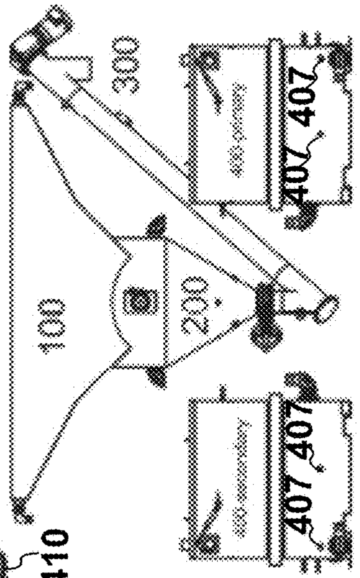
FIG. 15 is a rear view of the brine maker without a support frame.
Figure 16:
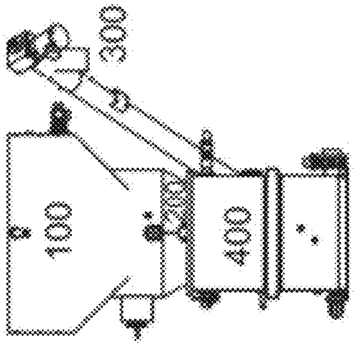
FIG. 16 is a side view of right side of the brine maker without a support frame.
Figure 17:
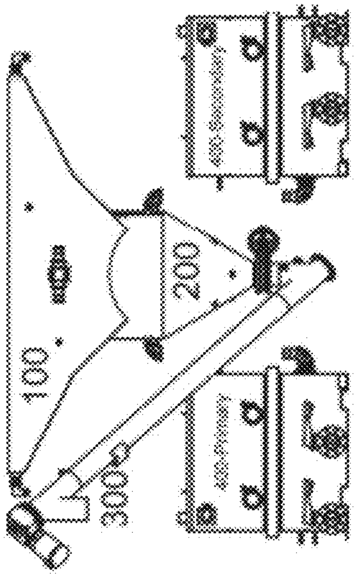
FIG. 17 is a front view of the brine maker without a support frame.

The system 106 may further include one or more areas in which the generated brine solution is contained and where velocity of the brine solution slows to allow sediment to fall out of suspension. For example, referring to FIG. 19, the system 106 may include two sediment tanks 400. Each of the sediment tanks 400 in the illustrated example has a filter 402, which may be fine mesh filter screen, to assist in removing suspended solids. Referring to FIG. 13, each of the sediment tanks 400 of the system 106 includes a brine solution outlet 410. The brine solution exiting the brine solution outlet 410 may be considered the output of the system 106 in some examples. Each of the sediment tanks 400 may further include a sediment chamber 416, which acts as a holding vessel and a filtration device. The velocity of the brine solution entering the sediment chamber 416 decreases or drops to zero, thereby allowing suspended solids to fall out of suspension.

In some examples, a filter 402, such as a screen, may divide the sediment chamber 416 into a dirty side 414 (or inlet side) and a clean side 415 (or outlet side). The filter 402 is configured to clean the solution and separate the clean solution from the dirty solution. The filter 402 or a partition may mechanically remove suspended solids from the brine solution.

The filter 402 of the sediment chamber 416 may be self-cleaning via one or more sprayers arranged in the sediment tanks 400 to back flush the filter 402. Solids will settle to the bottom of a sloped floor for removal.

In the example illustrated in FIG. 19, the filter 402 in the sediment chamber 416 is angled past 90 degrees, or in other words, is not perfectly vertical. With such an arrangement, gravity may assist in cleaning the filter 402. The brine solution may enter the sediment chamber 416 through the sediment tank inlet 401, flow into the dirty side 414 and through the filter 402 into the clean side 415. Because the filter 402 is angled toward the dirty side 414, debris captured in the filter 402 may be pulled by gravity toward the bottom of the dirty side 414 of the sediment chamber 416.

As indicated above, during operation of the system 106, the hopper assembly 107 accepts NaCl and $H_2O$, makes a brine solution therefrom, and the single conveyor 300 at the bottom of the hopper assembly 107 removes the debris out as a wetted material. This process may be controlled and performed as the system 106 is making the brine solution. For example, a controller may control the on/off time and/or the speed of the single conveyor 300 (for example, a variable speed of a motor driving the single conveyor 300) in order to regulate the amount and/or rate of the material discharged. Alternatively or in addition, the controller may control the amount and/or rate of solvent (water) entering the hopper assembly 107.

In some examples, the system 106 may include no sediment tank or only one sediment tank. In other examples, the system 106 may include two or more sediment tanks 400.

Alternatively or in addition, the filter 402 and/or a back wash 403 for the filter 402 may be located opposite of the flow of brine solution into the sediment tank 400 in order to back flush material from the filter 402 in each sediment chambers 416.

The back wash 403 may include one or more spray nozzles or, more generally, one or more spray outlets. Alternatively or in addition, the back wash 403 may be fixed in position. Alternatively, the back wash 403 may be rotatable or otherwise movable. For example, the back wash 403 may include a rotatable spray bar having a cylindrical shape as shown in FIG. 19. The movement of the back wash 403, and/or the flow of liquid to the one or more spray outlets of the back wash 403, may be controlled by the controller.

Alternatively or in addition, a sensor 404 or 405 in the sediment chambers 416 may be in communication with the controller to detect a liquid level in the sediment chamber 416. The controller may control the flow of the brine solution into or out of each of the sediment chambers 416. By having two sediment chambers 416, the controller may substantially limit the volume of solution flowing into in one of the sediment chambers in order to allow the filter to be backwashed while being substantially empty of the brine solution. The sediment chambers 416 may be controlled independently so that one is being cleaned and/or back flushed while the other is filtering and allowing the brine solution to flow in and out. Accordingly, the brine production process may be continuous and, at least part of the time, be concurrent with the cleaning process. The sediment tanks 400 may automatically alternate between filtering the solution in one sediment tank and the other being back flushed. Thus, one sediment tank 400 is in operation at any given time, while the other sediment tank 400 has its filter 402 back flushed for cycling back and forth in a continuous process.

Alternatively or in addition, the controller may be in communication with a sensor configured to monitor the concentration of the brine solution. The controller may be configured to dilute the concentration in order to meet a target set point mid-stream; in other words, dilute the concentration while the system 106 generates the brine solution. Alternatively or in addition, the controller may cause the brine solution be returned to the hopper assembly 107 in order to increase the amount of solute in suspension to a target level.

An overview of a method of operating the system 106 is: Bulk salt (solute) is added to the upper hopper 100; water (solvent) is added to the hopper assembly 107 via the upper hopper solvent inlet 104 and the lower hopper solvent inlets array 205. The solvent erodes the salt to form brine a solution. Insoluble material, such as rocks, sand, and any other insoluble solids, will migrate to the bottom of the lower hopper 200, through a conduit 302, and be discharged via the single conveyor 300 to a discharge port 301. The brine solution may then flow through a series of filter screens to separate solids from the solution. For example, an upper hopper overflow filter 101 and the lower hopper filter 201 may filter large debris from the solution in the hopper assembly 107. A brine solution flow 501 extends from the hopper assembly 107 to the sediment tank 400 and passes through a conduit. In the sediment tank 400, the velocity of the brine solution is slowed, and fine particles in suspension are allowed to fall to the bottom of the sediment tank 400. The brine solution may pass through the filter 402 in the sediment tank 400 resulting in a final product (the brine solution) available for use.

The following is an example of a method of operating the system 106, which refers to the figures. The method of operating the system 106 may include additional, fewer, and/or different operations than this example.

1. Salt (solute) is loaded into the upper hopper 100.

2. Water (solvent) is added to the salt at the upper hopper solvent inlet 104 and the lower hopper solvent inlets array 205. Each of these inlets 104 and 205 may operate independently or in conjunction depending on water flow availability. The addition of water (solvent) erodes the salt to form a brine solution.

3. Solids will naturally flow from the upper hopper 100 to the lower cone 200 portion via a sloped floor of the upper hopper 100, liquid flow from the upper hopper solvent inlet 104, and gravity.

4. The solution flows through the lower hoper filter 201, thru a conduit, and into the sediment tank 400.

5. The upper hopper over flow filter 101 allows solution to flow through it, thereby filtering out large debris. The upper hopper overflow filter 101 may include a cut out on the lower portion of the screen 105 that allows material that accumulates on the back side of the screen to return to the hopper. There may be a liquid level sensor 103 on the upper hoper 100 that indicates the liquid level is near the top of the upper hopper filter 101. The liquid level sensor 103 may be used by the controller to stop liquid flow to the hopper assembly 107 to prevent overflow.

6. The lower hopper filter 201 in the illustrated example has an opening in the bottom (at the lowest point 207) of the lower hopper filter 201 in order to allow solids to fall out and flow to the bottom of the lower hopper 200. In addition, the system 106 may include the back wash 202 that may be operated to back wash the screen 201 and force solids out of the area between the filter 201 and upper portion of the cone 208

7. The brine solution may flow from overflow filter 101 through an overflow outlet 102 join with the flow of brine solution exiting the lower hopper solution outlet 203. In some examples, a valve may select flow to go to one or more sediment tanks 400 via the brine solution flow 501.

8. If the system 106 is equipped with more than one sediment tank 400, then one of the sediment tanks 400 may be selected so as to have the brine solution flow 501 to the selected sediment tank at any given time. This enables the non-active sediment tank to have the filter 402 be cleaned via, for example, the back wash 403, in preparation for becoming active on a subsequent cycle.

9. The brine solution flows to the sediment tank 400 and flows through the dirty side 414 of the sediment tank 400. The velocity of the liquid is slowed to allow fine particles in the brine solution to fall out of suspension onto a sloped floor 409 of the sediment tank. The brine solution is further cleaned and suspended solids are separated therefrom by the filter 402 before entering into the clean side 415 of the sediment tank 400. The filter 402 may be inverted to allow for cleaning of debris from the filter 402.

10. The sediment tank 400 may be equipped with the back flush 403, which is configured to back flush the filter 402 with spray. The filter 402 may be back flushed if, for example, cleaning is required in order to ensure a free flow of material thru the filter 402 from the dirty side 414 to the clean side 415 of the sediment tank 400.

11. Sediment may build up on the sloped floor 409 of the sediment tank 400. This sediments may be removed via clean out drain valves 412 and 413. The sediment tank 400 may include one or more flush out ports 407 (see, for example, FIG. 15) through which a liquid, such as water, may be injected. The one or more flush out ports 407 may be located on the side of the sediment tank 400 that is opposite of the side on which the clean out drain valves 412 and 413 are located. The liquid injected through the flush out ports 407 forces solids towards the clean out drain valves 412 and 413, down the sloped floor, and through the clean out drain valves 412 and 413.

12. The sediment tank 400 may be equipped with a series of liquid level sensors 404 and 405 to indicate if the liquid level in the sediment tank 400 is low or high. These sensors 404 and 405 may be used to control flow to the sediment tanks and for a pumping out of the brine solution from the sediment tank 400.

13. Water may enter the hopper assembly 107 at 2 locations: the upper hopper 100 and the lower hopper 200. In the lower hopper 200, water may be the primary mixing source and the upper hopper is used to make solution and to force material from upper hopper into lower hopper cone.

14. Insoluble solid material may work its way down to the bottom of the lower hopper 200. At the bottom of the lower hopper 200, there is an optional valve 206. The valve 206 opens up periodically to allow waste material flow from the bottom of the hopper assembly 107 into an auger transition conduit 302, and then into the single conveyor 300 for discharge through a conveyor discharge port 301. The conveyor discharge port 301 may be positioned at an elevation above the highest level sensor in order to prevent the brine solution from flowing from the conveyor discharge port 301. The auger transition conduit 302 may be a vertically positioned, straight segment of pipe having a width that is in a range of 5 to 7 inches. For example, the conduit 302 may be six inches wide. In other examples, the conduit 302 may be outside of the range of 5 to 7 inches. The conduit 302 may be arranged so that waste material exiting the bottom of the conduit 302 falls directly onto the blade of the conveyor 300.

15. In lower hopper 200, there is an array of water/solvent entry points 205 that are located above discharge auger point 302. This array of water jets function is to dissolve the salt into a solution and to force the insoluble waste material into conduit 302 where the conveyor may remove the insoluble waste material. A spray port 303 in the conduit 302 may assist material flow into the conveyor 300.

16. The motor 305 for the conveyor 300 may be in communication with the controller. The controller may turn on the motor 305 (and thus the conveyor 300) and cause the conveyor 300 to discharge waste materials through an output port 301. The output port 301 is located at a point higher than the maximum liquid level in the hopper assembly 107 so as to avoid the brine solution exiting through the conveyor 300 instead of through, for example, outlet port 203. When to turn the conveyor 300 on or off may be set according to a predetermined time interval, after a predetermined volume of brine has been produced, and/or after a predetermined amount of waste material is discharged by the conveyor 300.

17. In some examples, the operation of the single conveyor 300 does not interfere with the brine production process and both actions occur at the same time during production of the brine solution.

18. There may be one or more sediment tanks 400, each including a controlled flow in and out via conduit flow 501. The filter back wash 403 may back flush the filters 402. With systems equipped with more than one sediment tank 400, the controller may be configured to cause only one sediment tank to be in operation at any given time. The brine solution flow 501 may enter the sediment tank 400 from the lower hopper cone 200 via the port 203. A flow of the brine solution from the sediment tank 400 through sediment tank port 413 is accomplished by a pumping system. Values indicative of the level of liquid in the sediment tank 400 received from the liquid level sensor 404 may be used by the controller in controlling the operation of a pump (not shown) in a pumping system (not shown) that receives the brine solution from the brine maker 106.

19. The sediment tank 400 that is not active goes through a back wash process 403 to clean the sediment tank filter screen 402. This helps ensure that the tank will be ready to accept solution when it becomes active. If equipped with more than 1 sediment tanks, the controller may be configured to cause the selection of which of the sediment tanks 400 is active, and which of the sediment tanks is non-active and being cleaned, to alternate or change on a perpetual basis. For example, one of the sediment tanks 400 may be active, while two other sediment tanks 400 are cleaned. As another example, two of the sediment tanks 400 may be filled with the brine solution from the hopper assembly 107 (active), while one or more of the other sediment tanks 400 are being cleaned (non-active).

20. The liquid level sensor 405 may detect a high liquid level in the sediment tank 400. The liquid level sensor 405 may be in communication with the controller. The controller may cause the flow to the sediment tank to stop via a control valve if the liquid level becomes too high. In response to this event, the controller may also stop the flow of the solvent to ports 104 & 205.

21. The filter 201 in the lower hopper 200 may allow some solids past the screen. In order to keep these solids in the lower hopper 200, the lowest point of the discharge port 203 may be located above the highest point of the filter 201.

22. There may be a gap at the lowest point 207 of the lower hopper filter 201 and a wall of the cone 208 to allow debris that has passed through the lower hopper filter 201 to exit into the lower portion of the cone for removal via the single conveyor 300.

23. The spray port 303 flushes material away from the lower hopper 200 via conduit 302 to the single conveyor 300.

Figure 22:
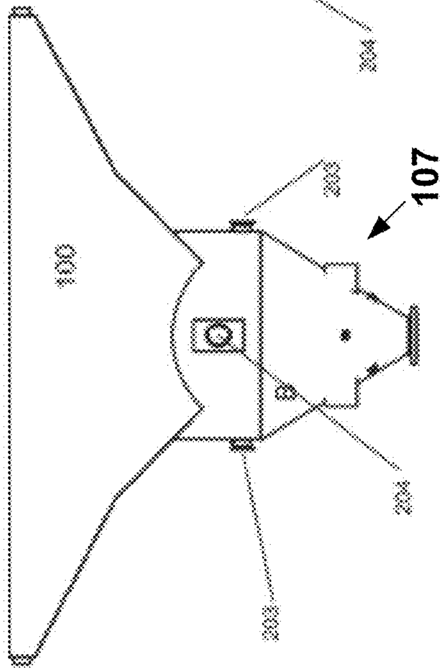
FIG. 22 is a rear view of the hopper assembly.
Figure 26:
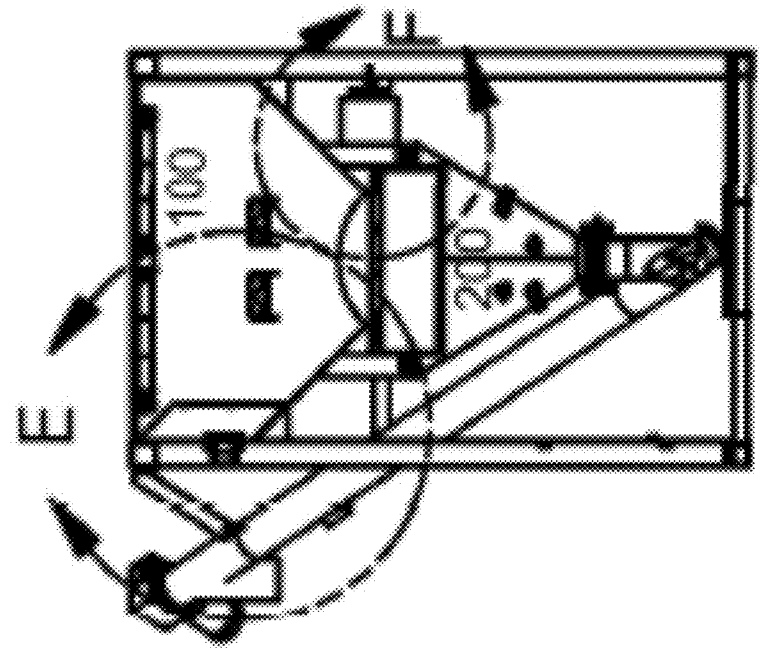
FIG. 26 is a cross-section of the brine maker cut along the section line D-D.
Figure 25:
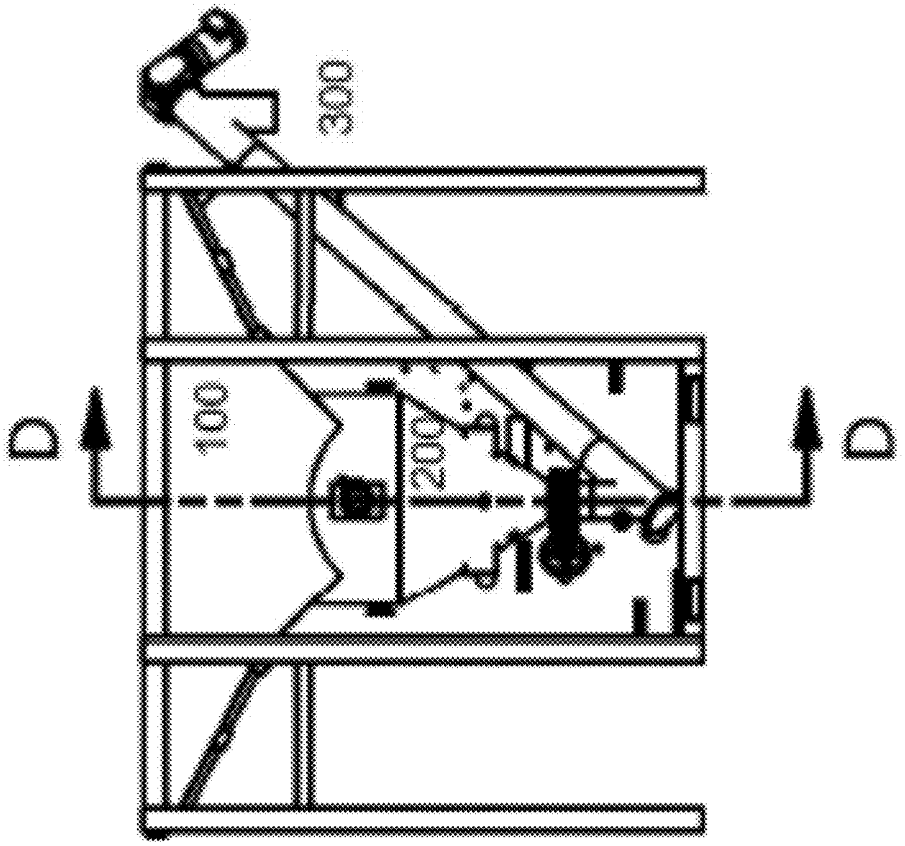
FIG. 25 is a rear view of the brine maker showing a section line D-D extending vertically through the middle of the brine maker.
Figure 27:
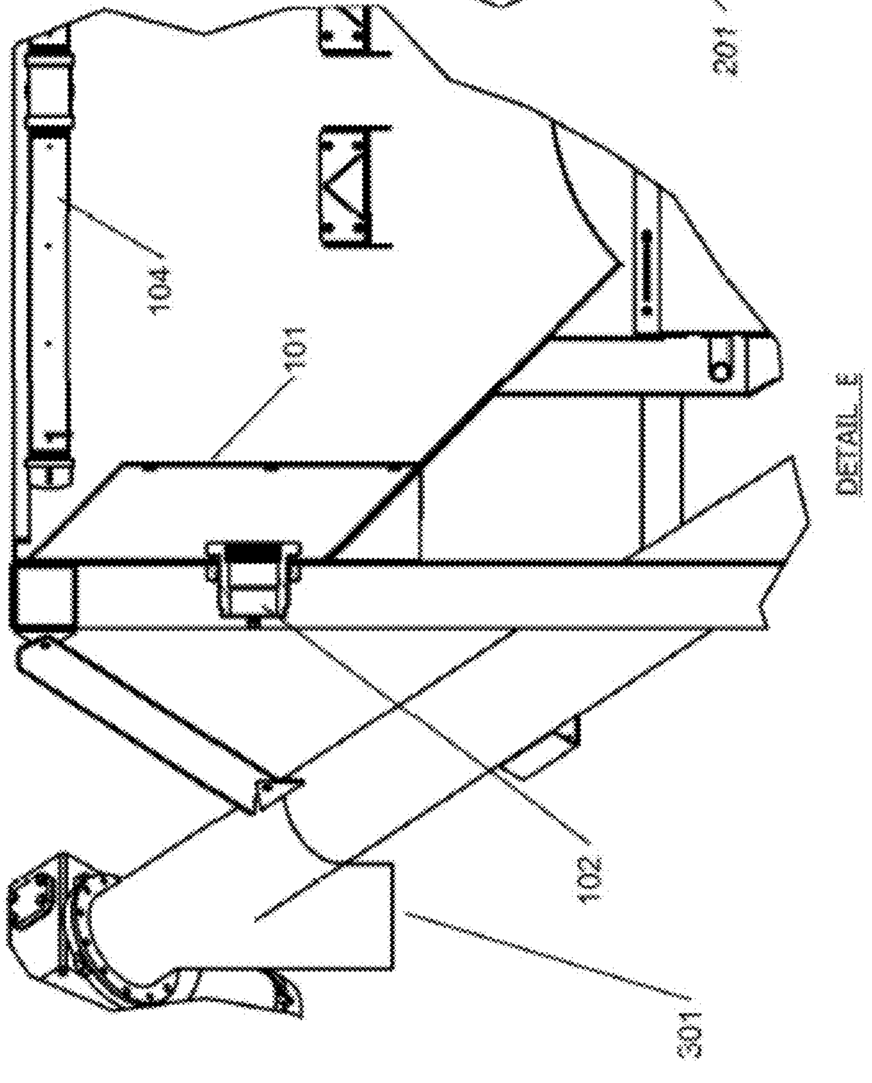
FIG. 27 illustrates details of a section designed E in FIG. 26.
Figure 28:
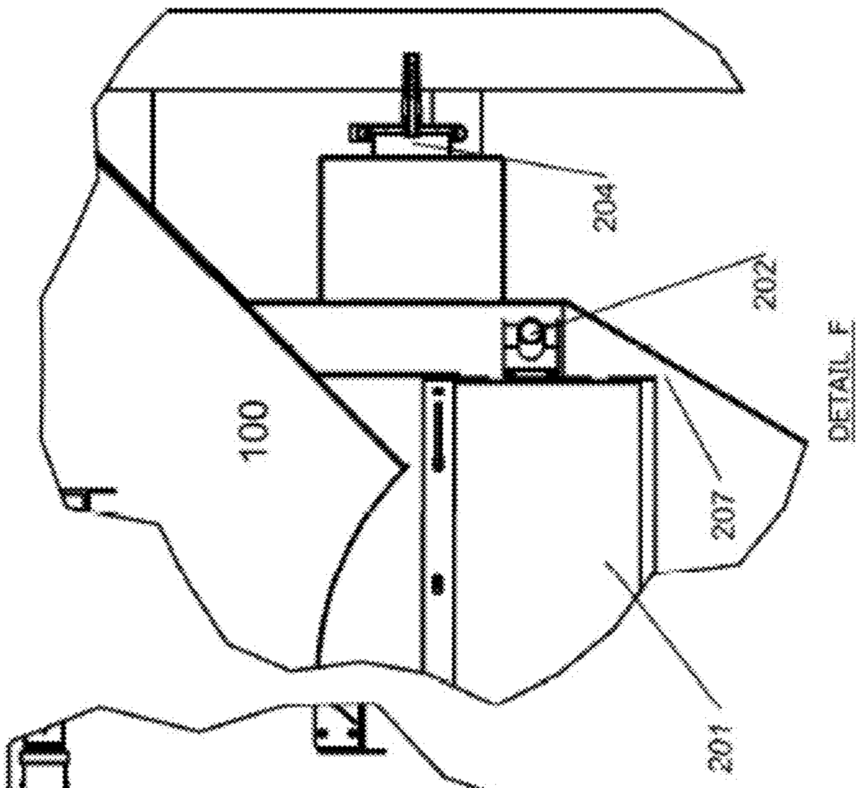
FIG. 28 illustrates details of a section designated F in FIG. 26.
Figure 30:
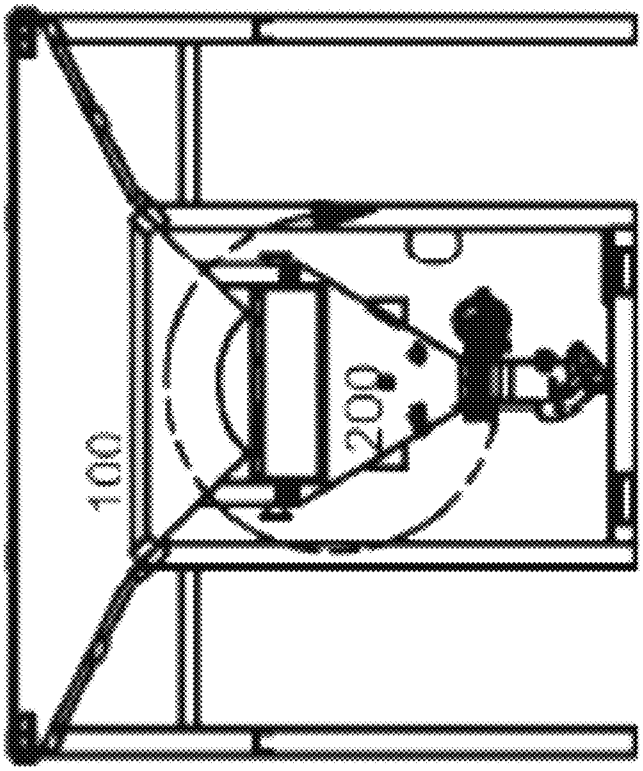
FIG. 30 is a cross-section of the brine maker cut along the section line B-B.
Figure 29:
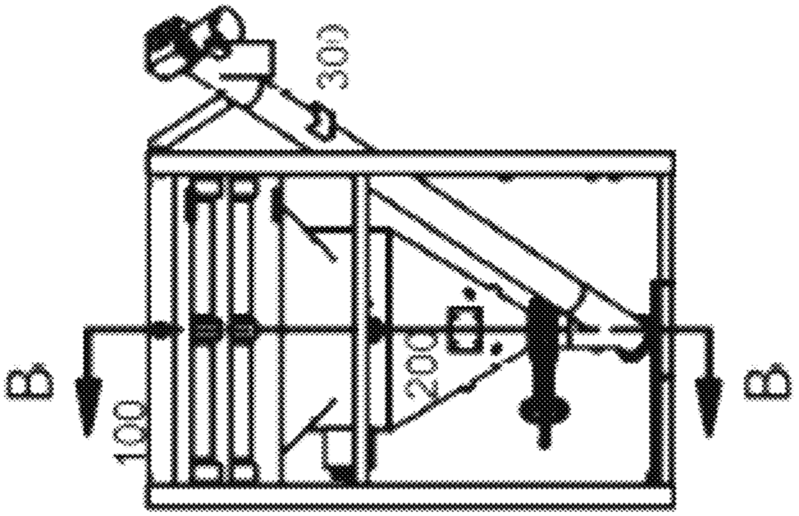
FIG. 29 is a side view of the right side of the brine maker showing a section line B-B extending vertically through the middle of the brine maker.
Figure 31:
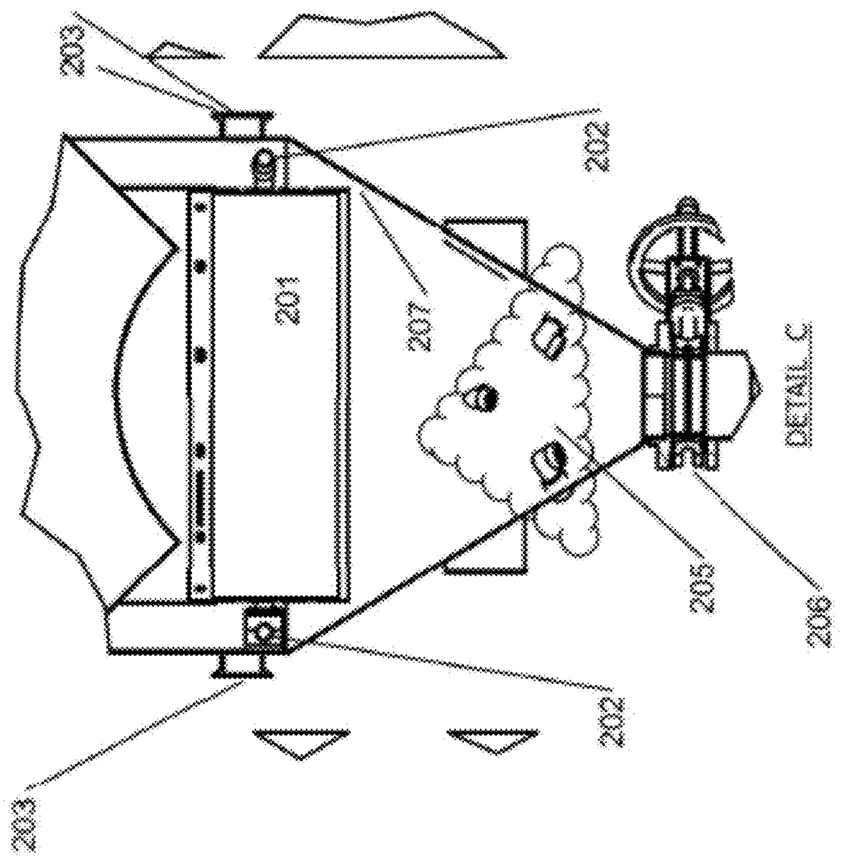
FIG. 31 illustrates details of a section designed C in FIG. 30.

24. As shown in FIG. 22, a liquid level sensor 204 in the hopper assembly 107 may detect if the liquid level is above the discharge port 203. Such an event may indicate blockage, valve failure, or other malfunction. Accordingly, in response to detecting this event, the controller may make a change in an automation process control, indicate a warning, and/or control solvent flow to the hopper assembly 107.

25. The upper hopper overflow filter 101 allows solution that passes through this screen will enter a conduit via 102, 203 and 501 for material flow into one or more of the sediment tanks 400.

26. There is a liquid level sensor in the upper hopper 103, if solution level gets above trip height of level sensor this will indicate high liquid level and trigger a warning lamp or if automated stop the water flow (solvent) into the hopper via 104 and/or 205.

27. During normal operation of the system 106, the liquid level in the hopper assembly 107 is not above the lower hopper liquid level sensor 204 in the lower hopper 200. If the lower hopper filter 201 becomes blocked by debris, then the liquid level may rise. The upper hopper overflow filter 101 may accept a flow of the solution that rises to the height where the upper hopper overflow filter 101 is located.

28. As the salt is dissolved into the brine solution, more salt will need to be added. This may be accomplished with a 3-5 cubic yard loader bucket, for example. Alternatively or in addition, this may be accomplished by a conveyor or other device. Keeping a majority of the upper hopper 100 empty of liquid solution may reduce the potential for splash over and contamination of surrounding work area when more salt is added.

As noted above, the method may include additional, different, or fewer steps than describe in the example above. For example, the method may include only the step of adding solvent to the salt at the upper hopper solvent inlet 104 and the lower hopper solvent inlets array 205. The steps may be performed in the order indicated by the steps number. Alternatively, the steps may be performed in a different order than indicated.

Figure 33:
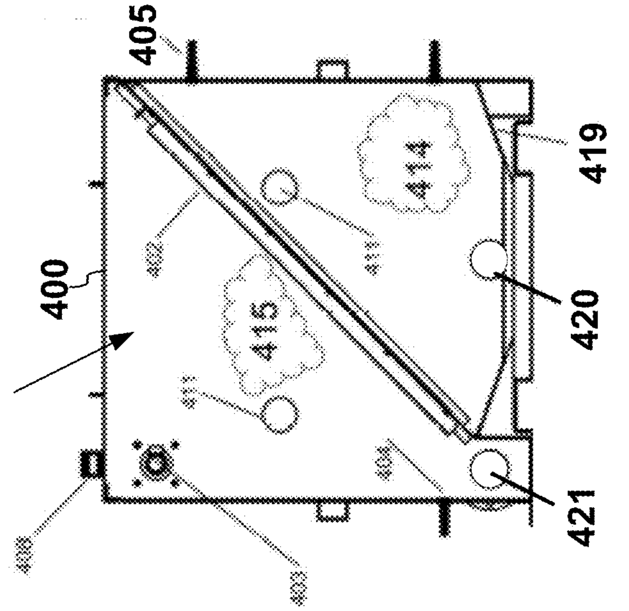
FIG. 33 illustrates an example of a sediment tank having a clean out conveyor.

The system 106 may be implemented with additional, different, or fewer components. For example, the sediment tank 400 may include a dirty side clean out conveyor 420 and a clean side clean out conveyor 421 as shown in FIG. 33. Examples of the conveyors 420 and 421 may include an auger, a screw conveyor, a bladed conveyor, or any other type of conveyor suitable to move debris from the bottom of the sediment tank chamber 416. Any of the filters described herein may comprise a screen, a grate, and/or any other type of filter capable of separating solids from a fluid.

The sloped floor 419 of the bottom of the sediment tank chamber 416 may help gravity move the debris to the conveyors 420 and 421. The conveyors 420 and 421, when turned on, may move the debris out of the sediment tank 400. The conveyors 420 and 421 may be operating while the sediment tank 400 is active. Accordingly, the brine maker 106 may include only one sediment tank 400 and yet still operate continuously.

The conveyors 420 and 421 may operate in conjunction with a sediment tank clean out valve 416. Alternatively, the conveyors 420 and 421 may replace the sediment tank clean out valve 416 and/or be used instead of the sediment tank clean out valve 416.

In some examples, the sediment tank 400 may include only one conveyor 420 or 421. In still other examples, the sediment tank 400 may include more than two conveyors 420.

Figure 32:
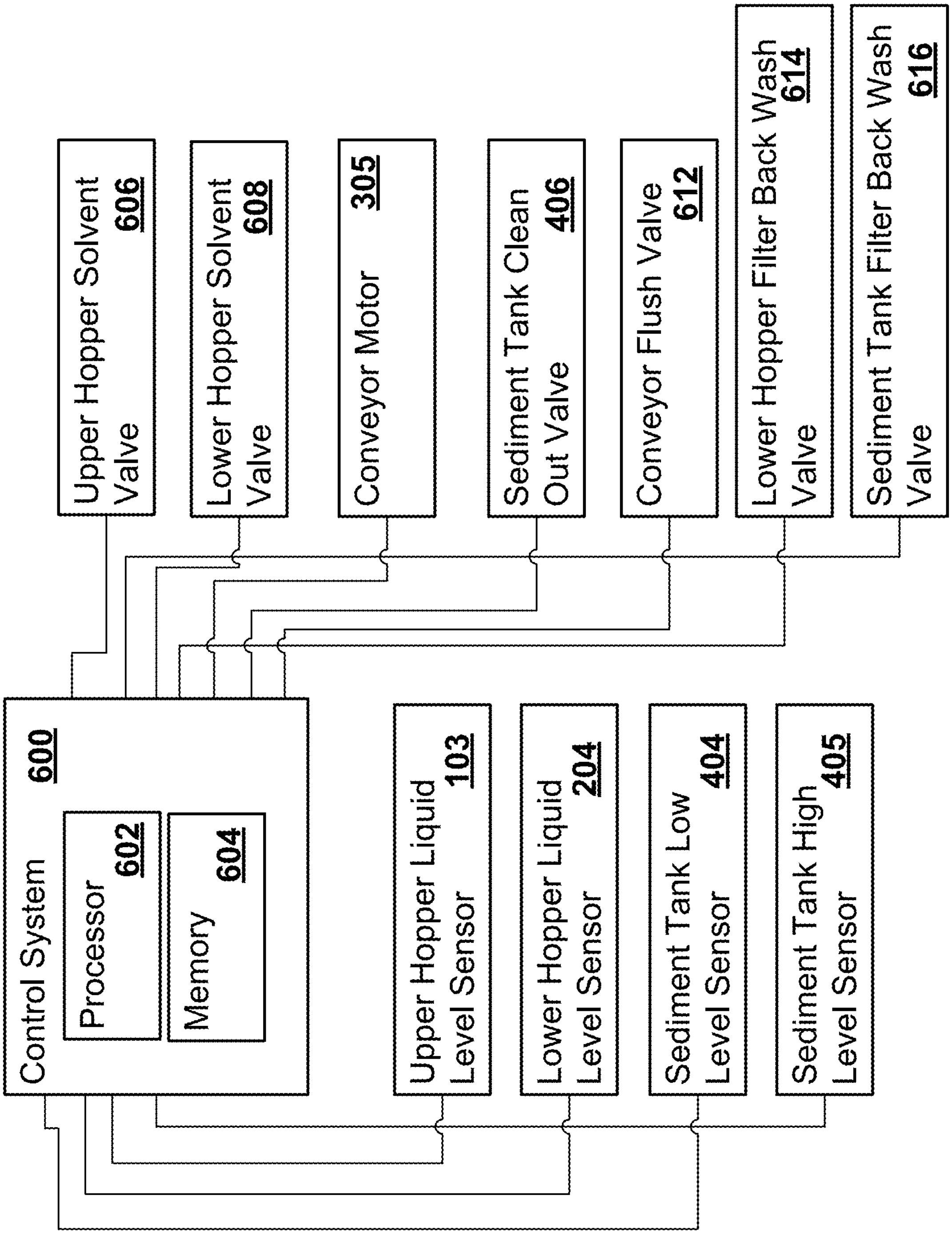
FIG. 32 is a schematic diagram of an example of a control system for the brine maker.

As another example, the system 106 may include a control system 600, such as the control system shown in the schematic diagram of FIG. 32. The illustrated example of the control system 600 includes a processor 602 and a memory 604. The system 106 includes the control system 600, the upper hopper liquid level sensor 103, the lower hopper liquid level sensor 204, the sediment tank low level sensor 404, the sediment tank high level sensor 405, an upper hopper solvent valve 606, a lower hopper solvent valve 608, the conveyor motor 305 and/or its controller, a sediment tank clean out valve 406, a conveyor flush valve 612, a lower hopper filter back wash valve 614, and a sediment tank filter back wash valve 616.

The processor 602, also referred to above as the controller, may be in communication with the memory 604. The processor 602 may be in communication with the other components illustrated in FIG. 32. Alternatively or in addition, the processor 602 may also be in communication with additional components, such as a display and/or a communication network interface. Examples of the processor 602 may include a programmable logic controller, a general processor, a central processing unit, a microcontroller, a controller, a server, an application specific integrated circuit (ASIC), a digital signal processor, a field programmable gate array (FPGA), and/or a digital circuit, analog circuit.

The processor 602 may be one or more devices operable to execute logic. The logic may include computer executable instructions or computer code embodied in the memory 604 or in other memory that when executed by the processor, cause the processor to perform the features implemented by the logic. The computer code may include instructions executable with the processor.

The memory 604 may be any device for storing and retrieving data or any combination thereof. The memory 604 may include non-volatile and/or volatile memory, such as a random access memory (RAM), a read-only memory (ROM), an erasable programmable read-only memory (EPROM), or flash memory. Alternatively or in addition, the memory may include an optical, magnetic (hard-drive) or any other form of data storage device.

The upper hopper solvent valve 606 may be a valve that controls the flow of the solvent through the upper hoper solvent inlet 104. The lower hopper solvent valve 608 may be a valve that controls the flow of the solvent through the lower hoper solvent inlets array 205. The sediment tank clean out valve 406 may be a valve that controls the flow of the liquid through the sediment tank flush out port 407. The sediment tank clean out valve 406 may be attached to the sediment tank flush out port 407. The conveyor flush valve 612 may be a valve that controls the flow of the solvent through the conveyor flush spray 303. The lower hopper filter back wash valve 614 may be a valve that controls the flow of the solvent through the lower hopper solvent inlets array 205. The sediment tank filter back wash valve 616 may be a valve that controls the flow of the liquid through the sediment tank filter back wash 403.

The system 106 may be implemented in many different ways. All of the discussion, regardless of the particular implementation described, is exemplary in nature, rather than limiting. For example, each component may include additional, different, or fewer components. As another example, each method may include additional, different, or fewer steps.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, programmable logic controller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

LEGEND OF CALLOUTS IN FIGURES

100 Upper Hopper
101 Upper Hopper Overflow Filter
102 Upper Hopper Overflow Outlet
103 Upper Hopper liquid level sensor
104 Upper Hopper Solvent Inlet
105 Screen solids waste drop out
106 Brine Maker
107 Hopper Assembly
108 Entry point of Conveyor
200 Lower Hopper Cone
201 Lower Hopper Filter
202 Lower Hopper Filter Back Wash
203 Lower Hopper Solution Outlet
204 Lower Hopper Liquid Level Sensor
205 Lower Hopper solvent inlets array
206 Lower Hopper knife Gate Valve
207 Lower Hopper screen waste drop out
208 Upper Cone
209 Lower cone
300 Waste Discharge Conveyor
301 Auger Discharge Port
302 Transition Lower Hopper to Auger
303 Auger flush spray
304 Blade
305 Motor
400 Sediment Tanks 1 & 2
401 Sediment Tank Inlet
402 Sediment Tank Filter
403 Sediment tank Filter Back Wash
404 Sediment tank Low Float
405 Sediment tank High Float
406 Sediment Tank Clean Out Valve
407 Sediment Tank Flush Out Port

408 Sediment Tank Vent
409 Sediment Tank Sloped Floor
410 Sediment Tank Solution Outlet
411 Sediment Tank inspection window
412 Sediment tank Clean out port Dirty side
413 Sediment tank Clean out port Clean side
414 Sediment tank Dirty Side
415 Sediment Tank Clean Side
416 Sediment Tank Chamber
419 Sloped Floor
420 Sediment Tank Dirty Side Clean Out Conveyor
421 Sediment Tank Clean Side Clean Out Conveyor
501 Flow to Sediment Tank Inlet
600 Control System
602 Processor
604 Memory
606 Upper Hopper Solvent Valve
608 Lower Hopper Solvent Valve
612 Conveyor Flush Valve
614 Lower Hopper Filter Back Wash
616 Sediment Tank Filter Back Wash Valve

What is claimed is:

1. A system comprising:

a single conveyor; and a hopper assembly configured to receive a salt and a solvent, the hopper assembly comprising a lower hopper having a shape in which sides of the lower hopper direct any solid contents of the lower hopper, under a force of gravity, towards an entry point of the single conveyor, the hopper assembly further comprising a solvent inlet arranged to spray the salt, wherein the solvent inlet is configured to create a brine solution from a spray of the solvent combined with the salt in the hopper assembly, and wherein the single conveyor is configured to remove debris from the hopper assembly at the entry point of the single conveyor, wherein the system further comprises an outlet for the brine solution, wherein the outlet for the brine solution is located above the solvent inlet, wherein the system further comprises a filter located within the hopper assembly, a wall of the filter extending vertically, wherein the filter is positioned so that the brine solution passes through filter before passing through the outlet.

2. The system of claim 1, wherein the hopper assembly comprises an upper hopper and the lower hopper is arranged to be fed by the upper hopper, and wherein the lower hopper includes a cone-shaped bottom having a narrowest end located at the entry point of the single conveyor.

3. The system of claim 1, wherein the hopper assembly further comprises a back wash configured to spray water against an outer surface of the filter to dislodge debris stuck to an inner surface of the filter.

4. The system of claim 1, wherein the filter is cylindrical filter having a curved wall oriented vertically, wherein a gap is formed between a bottom end of an outer wall of the cylindrical filter and an adjacent wall of the hopper assembly.

5. A system comprising:

a single conveyor;

a hopper assembly configured to receive a salt and a solvent, the hopper assembly comprising a lower hopper having a shape in which sides of the lower hopper direct any solid contents of the lower hopper, under a force of gravity, towards an entry point of the single conveyor, the hopper assembly further comprising a solvent inlet arranged to spray the salt, wherein the solvent inlet is configured to create a brine solution from a spray of the solvent combined with the salt in the hopper assembly, and wherein the single conveyor is configured to remove debris from the hopper assembly at the entry point of the single conveyor; and a plurality of sediment tanks configured to selectively receive the brine solution from an outlet of the hopper assembly, wherein each of the sediment tanks is configured to cause solids suspended in the brine solution to fall out of suspension, wherein a first one of the sediment tanks is configured to receive the brine solution from an outlet of the hopper assembly while a second one of the sediment tanks is configured to clean a filter in, and/or debris from, the second one of the sediment tanks.

6. The system of claim 1, further comprising an upper hopper overflow screen configured to filter an overflow of the brine solution in the hopper assembly, wherein the hopper assembly is configured to combine the filtered overflow passed through an overflow outlet with the brine solution received through an outlet of the hopper assembly that is positioned lower than the overflow outlet.

7. The system of claim 1, wherein the solvent inlet includes a plurality of nozzles arranged around an inner perimeter of the lower hopper.

8. The system of claim 1, wherein the single conveyor comprises a vertically positioned conduit, which is configured to direct debris pulled by gravity from the entry point of the single conveyor to a blade of the single conveyor.

9. A sediment tank for a brine maker, the sediment tank comprising:

an inlet configured to receive a brine solution from a hopper assembly;

a sediment chamber configured to cause a plurality of solids suspended in the brine solution to fall out of suspension by a slowing down of a flow of the brine solution;

an outlet; and a sediment tank filter that divides the sediment chamber into a dirty side fed by the inlet and clean side arranged to feed the outlet with the brine solution.

10. The sediment tank of claim 9, further comprising a conveyor configured to remove the solids from a bottom of the sediment chamber.

11. The sediment tank of claim 9, further comprising a sediment tank clean out valve and a sediment tank flush out port, wherein the sediment tank clean out valve is configured to control a flow of liquid into the sediment chamber to flush out the solids from a bottom of the sediment chamber into the sediment tank flush out port.

12. The sediment tank of claim 9, wherein the sediment tank filter is at an angle so a top portion of the sediment tank filter leans toward the dirty side.

13. The sediment tank of claim 9, further comprising a sprayer configured to back flush the sediment tank filter.

14. The sediment tank of claim 9, comprising a level sensor configured to detect a level of the brine solution in the sediment chamber.

15. A sediment tank for a brine maker, the sediment tank comprising:

an inlet configured to receive a brine solution from a hopper assembly;

a sediment chamber configured to cause a plurality of solids suspended in the brine solution to fall out of suspension by a slowing down of a flow of the brine solution;

an outlet; and a conveyor configured to remove the solids from a bottom of the sediment chamber.

16. The sediment tank of claim 15, further comprising a sediment tank clean out valve and a sediment tank flush out port, wherein the sediment tank clean out valve is configured to control a flow of liquid into the sediment chamber to flush out the solids from a bottom of the sediment chamber into the sediment tank flush out port.

17. The sediment tank of claim 15, further comprising a sediment tank filter that divides the sediment chamber into a dirty side fed by the inlet and clean side configured to supply the outlet with the brine solution.

* * * * *